United States Patent
Smith

[15] 3,699,735
[45] Oct. 24, 1972

[54] SEALING GASKET
[72] Inventor: Marvin Glenn Smith, Houston, Tex.
[73] Assignee: Helmerich & Payne, Inc., Houston, Tex.
[22] Filed: June 10, 1970
[21] Appl. No.: 45,022

[52] U.S. Cl. ..................52/400, 49/493, 52/403
[51] Int. Cl. ...............................................E04b 1/62
[58] Field of Search ..52/403, 400; 49/489, 480, 481, 49/482, 486, 487, 493, 499

[56] References Cited

UNITED STATES PATENTS

| | | | |
|---|---|---|---|
| 2,102,578 | 12/1937 | Gail | 49/493 |
| 2,363,530 | 11/1944 | Iwashita | 49/499 X |
| 3,284,956 | 11/1966 | Bailey | 49/493 |
| 3,336,707 | 8/1967 | Horggn, Jr. | 52/400 X |
| 3,378,957 | 4/1968 | Frehse | 49/489 X |
| 3,092,877 | 6/1963 | Perilstein | 52/403 X |
| 2,655,239 | 10/1953 | Kenlock | 52/400 |
| 3,045,787 | 7/1962 | Attwood | 52/400 X |
| 3,312,026 | 4/1967 | Rolland | 52/403 |

FOREIGN PATENTS OR APPLICATIONS

| | | | |
|---|---|---|---|
| 201,689 | 8/1923 | Great Britain | 49/490 |
| 1,261,638 | 4/1961 | France | 52/403 |

*Primary Examiner*—Alfred C. Perham
*Attorney*—Murray Robinson, Ned L. Conley and David Alan Rose

[57] ABSTRACT

An elongated elastomeric sealing gasket whose cross section may be comprised of generally parallel side portions connected by a web portion to form oppositely disposed channels adjacent to the web portion. Two elongated tongue members project from one of the side portions forming another channel therebetween. There may be a longitudinal groove in the side portion between the tongue members for receiving a longitudinal locking strip. The tongue members may be held in engagement with a structural member by an elongated anchor strip fastened to the structural member. A portion of the anchor strip may be disposed in the channel between the tongue members to prevent deflection thereof and to cooperate with the structural member to form longitudinal recesses in which the tongue members are retained.

6 Claims, 2 Drawing Figures

PATENTED OCT 24 1972

3,699,735

Marvin Glenn Smith
INVENTOR.

BY
Bill B Berryhill
ATTORNEY

3,699,735

SEALING GASKET

BACKGROUND OF THE INVENTION

1. Field of the Invention

This invention concerns structural gaskets or seals. Specifically, it pertains to elastomeric sealing members suitable for window glazing.

2. Description of the Prior Art

Structural gaskets are elastomeric mechanical seals that attach a panel of glass, or other material, to another panel or a framework of metal, or other building material. A widely used gasket design utilizes a generally H-shaped cross-section which provides oppositely disposed channels, one of which sealingly engages a window glass panel and the other of which sealingly engages the surrounding window frame or wall. Usually, these gaskets are made in two parts, the gasket itself and a separate locking strip. After, the gasket channels are properly placed, the locking strip or "zipper", as it is sometimes called, is inserted into a continuous mating groove provided in one side of the H-shaped cross-section. This causes the lips of the gasket to effectively clamp and seal the panel and its surrounding framework.

It is sometimes desirable to join a panel of glass, or other material, to a panel of like material without providing a complete window frame therebetween. Structural gaskets used for this purpose are called "mullions" if they are vertical, and "muntins" if they are horizontal. They do not provide much structural strength, but they provide resistance to blowout pressure substantially equivalent to that which would be present if the glass or panel were all in one piece rather than being subdivided by muntins and mullions. To provide additional blowout resistance the mullions and/or muntins sometimes include a stiffening member of metal to which the gaskets are tied. However with gaskets of the prior art which are tied to stiffening members, it has been necessary to glaze or apply the "zipper" strip from the exterior of the building. This of course usually requires extensive scaffolding and is certainly more hazardous and expensive to install.

SUMMARY OF THE INVENTION

The present invention provides a structural glazing gasket which allows glazing, from the interior of a building. Tongue members projecting from the side of a gasket of H-shaped cross-section allows the gasket to be tied to a structural stiffening member. This is all done from the interior of the building. An anchor strip is fastened to the stiffening member in such a manner that it is partially disposed between the tongue members preventing inward deflection thereof. The anchor strip along with the stiffening member forms recesses in which the tongue members are retained, tieing the gasket to the stiffening member.

In addition, the gasket provides a complete thermal barrier between the exterior and the interior of the building. It also creates both an aesthetic and functional building design.

BRIEF DESCRIPTION OF THE DRAWING

Further objects and advantages of the invention will become apparent from the following description when taken in conjunction with the drawing in which.

DESCRIPTION OF THE PREFERRED EMBODIMENT

Figure 1:
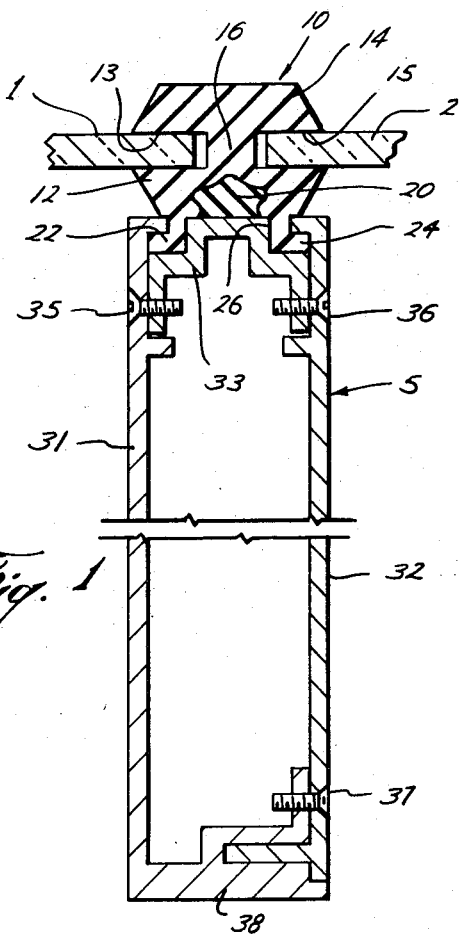
FIG. 1 is a detailed horizontal cross-section of a mullion comprising a gasket and stiffener according to a preferred embodiment of the invention and FIG. 2 is a detailed horizontal cross-section of a mullion comprising a gasket identical to the one in FIG. 1 but attached to an alternate stiffener member according to another preferred embodiment of the invention.

Looking first at FIG. 1, a gasket 10 is shown connecting glass panels 1 and 2 and attached to a stiffener member 5, forming a mullion in this case. Gasket 10, made of an elastomeric material, such as neoprene, comprises a pair of generally parallel side portions 12, 14 and a web 16, forming the cross member of the "H". The parallel side portions 12, 14 and web 16 form oppositely disposed channels 13, 15 which sealingly engage their respective glass panels 1 and 2.

A locking strip or "zipper" 20 generally of a material harder than gasket 10, is disposed in a longitudinal groove in side portion 12, substantially along the axis of web 16. A pair of longitudinal tongue members 22, 24 project away from side portion 12, one on each side of locking strip 20 forming a channel 26 therebetween. The tongue members 22, 24 shown are L-shaped in cross-section. However, it should be understood that many other shapes could be used. For example, the foot of the "L" could be replaced by a bulbous tip.

Vertical stiffener member 5 comprises side members 31, 32 and anchor strip 33 made of aluminum or another stiff material. Longitudinal anchor strip 33 has a portion disposed in tongue channel 26 and along with side members 31, 32 form recesses in which tongue members 22, 24 are retained. THus, gasket 10 is firmly affixed to stiffener 5.

To install gasket 10, the ends of side portion 12, with "zipper" 20 removed, would be bent back allowing panels 1, 2 to be inserted in their respective channels 13, 15. Then the locking strip 20 would be installed to effect the seal between gasket 10 and panels 1 and 2. All of this can be done from the interior of the building construction.

Next, the gasket 10 would be attached to stiffener 5. This could be done in several ways. With the type stiffener shown, side member 31 and anchor strip 33 would probably be attached first by fastening means such as screws 35 with gasket tongue 22 properly positioned in its recess and tongue channel 26 engaging the anchor strip 33. Finally, side member 32 would be attached to anchor strip 33 and side member 31 by fastening means such as screws 36 and 37 making sure that tongue 24 is properly disposed in the recess formed by anchor strip 33 and side member 32. Anchor strip 33 and the opposite edge 38 of side member 31 also act as spacers to prevent the sides of stiffener 5 from being drawn too close together. If such were allowed to happen, the effectiveness of the seal at panels 1 and 2 would be reduced.

Figure 2:
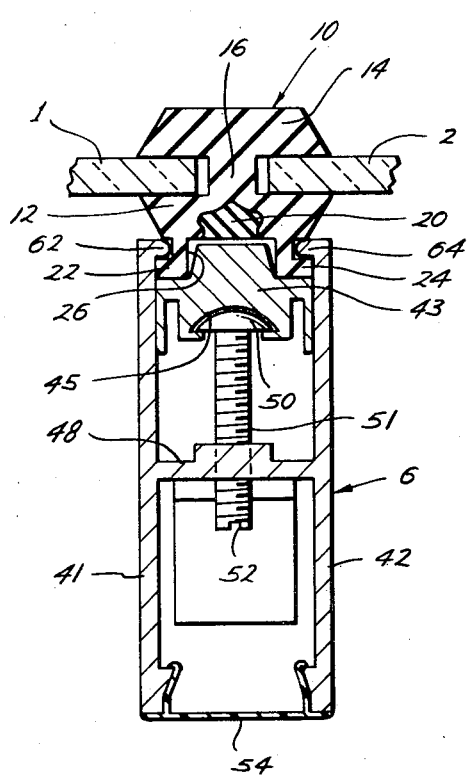

Referring now to FIG. 2, another embodiment of the invention will be described. The gasket 10 is the same and the same reference numbers directed thereto will be used. The difference lies in the construction of the stiffening member to which it is attached. With this particular construction no part of the fastening means is exposed, such as the screws 35, 36, 37 in the embodiment of FIG. 1.

The stiffener 6 of the present embodiment comprises side members 41, 42 and cross-member 48 of a unitary construction. Anchor strip 43 as in the previous embodiment, engages tongue channel 26 and cooperates with sides 41, 42 to form recesses for retaining tongue 22, 24. However, anchor strip 43 is also provided with a channel 45 opposite the side facing gasket 10. In this channel 45 is mounted the heads 50 of a plurality of bolts 51 which are threadingly engaged in holes of cross-member 48. The end of bolt 51 is slotted to provide engagement means 52 for a screw driver or the like. The opening along one edge of stiffener 6 may be closed by a spring clip attached closure member 54.

As in the previous embodiment, gasket 10 is first attached to panels 1 and 2 and sealed thereto by locking strip 20. To attach gasket 10 to stiffener 6, anchor strip 43 is retracted toward cross-member 48 by turning bolts 51 in the proper direction. This allows tongues 22, 24 to be deflected toward each other allowing passage by lateral shoulders 62, 64. Then bolts 52 are turned in the opposite direction to return anchor strip 43 to the position shown, fully engaging tongue channel 26 and retaining tongue 22 and 24 in the recesses formed by anchor strip 43 and the sides 41, 42 of structural member 6.

As can be seen, the gasket construction of the present invention offers several advantages over the prior art. It allows all glazing to be done from the interior of a building. It provides a complete thermal barrier between the exterior of the panels and the stiffeners to which they are anchored. Furthermore, it provides a wall construction which is both aesthetic and functional. Still further, it allows the replacement of panels without damage to the gasket and the associated stiffening members.

Two embodiments of the invention are shown in the drawing and described in the specification, but many variations thereof will be apparent to those skilled in the art. It is not practical to show or describe all the variations included within the invention, and therefore the embodiments described should be considered illustrative only, and not limiting, the scope of the invention being as broad as is defined by the appended claims. The form of the claims and the specification, including the Abstract, is adopted solely for easier reading and understanding, and should not be considered in interpreting the scope of the invention claimed.

I claim:

1. A panel construction wherein two panel members are sealingly connected by an elongated elastomeric gasket member having a generally H-shaped cross-section comprising an inner side and an outer side connected by a web portion and forming a first and second channel on each side of said web portion for sealingly engaging first and second panel members characterized by at least two elongated tongue members projecting away from said inner side, said tongue members forming a third channel therebetween, and each having a flange projecting away from said third channel, said inner side having ends each forming a fourth and fifth channel with said flanges, a stiffening member whose axis is generally parallel with the longitudinal axis of said gasket member, said stiffening member having inwardly directed shoulders engaging said fourth and said fifth channels, said inner side having a longitudinal groove between said tongue members, a longitudinal groove locking strip mounted in said groove for effecting the seal between said gasket and said first and second panel members, and an elongated anchor strip attached to said stiffening member, a portion of said anchor strip being disposed between said tongue members and cooperating with said stiffening member to form recesses in which said tongue members and said flanges are retained.

2. A panel construction wherein two panel members are sealingly connected by an elongated elastomeric gasket member having a generally H-shaped cross-section comprising substantially parallel side portions connected by a web portion and forming a first and second channel on each side of said web portion for sealingly engaging first and second panel members, characterized by at least two elongated tongue members projecting away from one of said side portions and engaging a stiffening member whose axis is generally parallel with the longitudinal axis of said gasket member, said one of said side portions having a longitudinal groove between said tongue members, a longitudinal locking strip mounted in said groove for effecting the seal between said gasket and said first and second panel members, an elongated anchor strip attached to said stiffening member, a portion of said anchor strip being disposed between said tongue members and cooperating with said stiffening member to form recesses in which said tongue members are retained, said stiffening member having a channel in which said anchor strip is mounted, a portion of said stiffening member being removable to allow removal or replacement of said anchor strip.

3. A panel construction wherein two panel members are sealingly connected by an elongated elastomeric gasket member having a generally H-shaped cross-section comprising substantially parallel side portions connected by a web portion and forming a first and second channel on each side of said web portion for sealingly engaging first and second panel members, characterized by at least two elongated tongue members projecting away from one of said side portions and engaging a stiffening member whose axis is generally parallel with the longitudinal axis of said gasket member, said one of said side portions having a longitudinal groove between said tongue members, a longitudinal locking strip mounted in said groove for effecting the seal between said gasket and said first and second panel members, an elongated anchor strip attached to said stiffening member, a portion of said anchor strip being disposed between said tongue members and cooperating with said stiffening member to from recesses in which said tongue members are retained, said stiffening member comprising a channel in which said anchor strip is mounted, said anchor strip being movable to a position in said channel in which said portion of said anchor strip is retracted from said disposition between said tongue members to allow disengagement of said gasket member from said stiffening member.

4. A panel construction wherein panel members are sealingly connected by an elongated elastomeric gasket member having a generally H-shaped cross-section comprising substantially parallel side portions connected by a web portion and forming channels on each side of said web portion for sealingly engaging said panel members characterized by at least two elongated tongue members projecting away from one of said portions forming another channel therebetween and engaging a stiffening member whose axis is generally parallel with the longitudinal axis of said an member, n elongated anchor strip being fastened to said stiffening member, a portion of said anchor strip being disposed in said another channel preventing deflection of said tongue members toward each other and maintaining the engagement of said tongue members and said stiffening member, said anchor strip and a portion of said stiffening member being separable from the remaining portion of said stiffening member to allow disengagement of said tongue members.

5. A panel construction wherein panel members are sealingly connected by an elongated elastomeric gasket member having a generally H-shaped cross-section comprising substantially parallel side portions connected by a web portion and forming channels on each side of said web portion for sealingly engaging said panel members, characterized by at least two elongated tongue members projecting away from one of said portions forming another channel therebetween and engaging a siffening member whose axis is generally parallel with the longitudinal axis of said gasket member, an elongated anchor strip being fastened to said stiffening member, a portion of said anchor strip being disposed in said another channel preventing deflection of said tongue members toward each other and maintaining the engagement of said tongue members and said stiffening member, said portion of said anchor strip being movable on said stiffening member our of said disposition in said another channel to allow disengagement of said tongue members.

6. A panel construction for sealingly engaging panel members, comprising:

an elongated elastomeric sealing gasket having an inner side and an outer side connected by a web forming a first and second channel between said sides, and at least two elongated tongue members projecting away from said inner side, said tongue members forming a third channel therebetween and each having a flange projecting away from said third channel, said inner side having ends forming fourth and fifth channels with said flanges, and a longitudinal groove between said tongue members, a stiffening member whose axis is generally parallel with the longitudinal axis of said gasket member, said stiffening member having inwardly directed shoulders received in said fourth and fifth channels formed by said inner side and said flanges, a removable longitudinal locking strip in said longitudinal groove of said inner side forming a composite part of said inner side thereby partially defining said third channel, and a removable anchor strip fastened to said stiffening member and received in said third channel thereby interlocking said tongue members and said flanges between said stiffening member and said anchor strip.

* * * * *

PO-1050
(5/69)

UNITED STATES PATENT OFFICE
CERTIFICATE OF CORRECTION

Patent No. 3,699,735　　　　　　　　　Dated October 24, 1972

Inventor(s)　　Marvin Glenn Smith

It is certified that error appears in the above-identified patent and that said Letters Patent are hereby corrected as shown below:

Column 4, line 4, before "locking strip" delete "groove". Colume 5, line 7, after "said" delete "an" and insert -- gasket --; line 7, after "member" delete "n" and insert -- an --; line 26, after "a" delete "siffening" and insert -- stiffening --. Column 6, line 3, before "of said" delete "our" and insert -- out --.

Signed and sealed this 27th day of March 1973.

(SEAL)
Attest:

EDWARD M. FLETCHER, JR.　　　　　　　ROBERT GOTTSCHALK
Attesting Officer　　　　　　　　　　Commissioner of Patents